United States Patent
Wada et al.

(10) Patent No.: US 12,536,285 B2
(45) Date of Patent: Jan. 27, 2026

(54) THREAT ANALYSIS METHOD AND THREAT ANALYSIS SYSTEM

(71) Applicant: Panasonic Automotive Systems Co., Ltd., Kanagawa (JP)

(72) Inventors: Hiroyuki Wada, Kyoto (JP); Yusuke Nemoto, Hyogo (JP); Minehisa Nagata, Osaka (JP); Hatsuho Aoshima, Osaka (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 66 days.

(21) Appl. No.: 18/587,605

(22) Filed: Feb. 26, 2024

(65) Prior Publication Data

US 2024/0193273 A1 Jun. 13, 2024

Related U.S. Application Data

(63) Continuation of application No. PCT/JP2022/018573, filed on Apr. 22, 2022.

(30) Foreign Application Priority Data

Sep. 27, 2021 (JP) ................................ 2021-156545

(51) Int. Cl.
G06F 21/56 (2013.01)

(52) U.S. Cl.
CPC ...... G06F 21/566 (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,743,421 B2* | 6/2010 | Cosquer | H04L 63/1441 709/224 |
| 8,938,802 B2* | 1/2015 | Davenport | H04L 63/145 726/22 |

(Continued)

FOREIGN PATENT DOCUMENTS

| JP | 2008-234409 | 10/2008 |
|---|---|---|
| JP | 6384465 | 9/2018 |

(Continued)

OTHER PUBLICATIONS

Office Action dated Feb. 4, 2025 issued in Japanese patent application No. 2021-156545 along with a corresponding English translation.

(Continued)

*Primary Examiner* — Backhean Tiv
(74) *Attorney, Agent, or Firm* — Greenblum & Bernstein, P.L.C.

(57) ABSTRACT

A threat analysis method includes acquiring system configuration information indicating hardware components of a system for which threat analysis is performed, function allocation information indicating functions allocated to the hardware components, an asset information indicating assets used in each function, and asset input/output information indicating hardware components of input/output sources and input/output destination of the asset; deriving a physical data flow that indicates a flow of the asset corresponding to each hardware component and a logical data flow that indicates a flow of the asset corresponding to each function in accordance with the acquired information and analyzing a likelihood of an attack on the asset and an impact of the attack (Continued)

on the asset for each of the hardware components and each of the functions in accordance with the physical data flow and the logical data flow; and outputting a result of the analysis.

8 Claims, 15 Drawing Sheets

(56) References Cited

U.S. PATENT DOCUMENTS

| | | | | |
|---|---|---|---|---|
| 9,979,743 B2* | 5/2018 | Hovor | ............... | H04L 63/1433 |
| 11,709,946 B2* | 7/2023 | Murphy | ............. | H04L 63/1458 |
| | | | | 726/16 |
| 2013/0212659 A1* | 8/2013 | Maher | ............... | G05D 1/0022 |
| | | | | 726/6 |
| 2015/0281267 A1* | 10/2015 | Danahy | ............... | H04L 63/1416 |
| | | | | 726/23 |
| 2015/0381649 A1* | 12/2015 | Schultz | ............. | G06Q 10/0635 |
| | | | | 726/25 |
| 2017/0048266 A1* | 2/2017 | Hovor | ............... | H04L 63/1433 |
| 2019/0026462 A1* | 1/2019 | Berg | ............... | G06F 21/577 |
| 2019/0243977 A1* | 8/2019 | Pfleger de Aguiar | ...................... | |
| | | | | G06F 21/566 |
| 2020/0053112 A1* | 2/2020 | Torisaki | ............. | H04L 63/1425 |
| 2021/0029153 A1* | 1/2021 | Sugimoto | ........... | H04L 63/1441 |
| 2021/0295232 A1* | 9/2021 | Hicks | ................... | G06F 11/079 |
| 2021/0344700 A1* | 11/2021 | Ueno | ................... | G06F 21/552 |
| 2022/0108010 A1* | 4/2022 | Bishop, III | ............. | G06F 8/436 |
| 2022/0147623 A1* | 5/2022 | Hirobe | ................. | G06F 21/577 |
| 2022/0201022 A1* | 6/2022 | Singh | ................. | H04L 63/1425 |
| 2024/0193273 A1* | 6/2024 | Wada | ................... | G06F 21/577 |
| 2024/0217459 A1* | 7/2024 | Zhou | ...................... | G06F 9/448 |

FOREIGN PATENT DOCUMENTS

| | | |
|---|---|---|
| JP | 2019-145053 | 8/2019 |
| WO | 2019/093059 | 5/2019 |
| WO | 2020/202884 | 10/2020 |

OTHER PUBLICATIONS

International Search Report issued in International Pat. Appl. No. PCT/JP2022/018573, dated Jun. 28, 2022, along with an English translation thereof.

* cited by examiner

FIG. 3

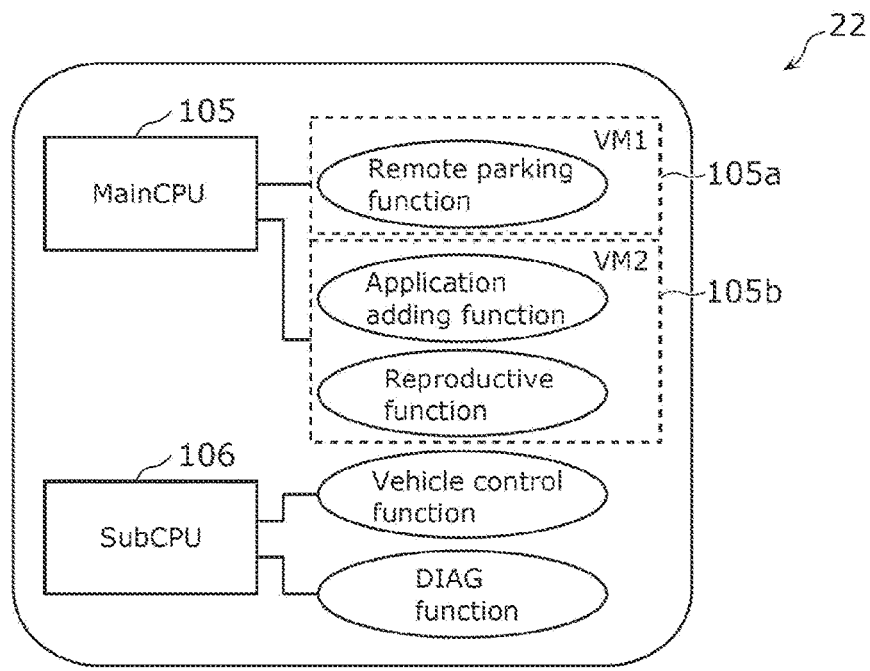

FIG. 4

| | Direct impact at the time of security violations | | | |
|---|---|---|---|---|
| Asset name | Safety | Financial | Operational | Privacy |
| Parking location | Negligible (Neither vehicle's function nor performance is affected) | Major (Losses equivalent to vehicle price) | Negligible (Neither vehicle's function nor performance is affected) | Severe (Individual is identifiable) |
| Authentication information | Negligible (Neither vehicle's function nor performance is affected) | Negligible (Losses equivalent to vehicle price) | Negligible (Neither vehicle's function nor performance is affected) | Severe (Individual is identifiable) |

FIG. 6A

| Remote parking function | Low |
|---|---|
| Application adding function | High |
| Reproductive function | Medium |
| Vehicle control function | Very low |
| DIAG function | Low |

FIG. 6B

| Remote wireless connection | High |
|---|---|
| Proximity wireless connection | Medium |
| Direct connection | Low |
| Physical connection | Very low |

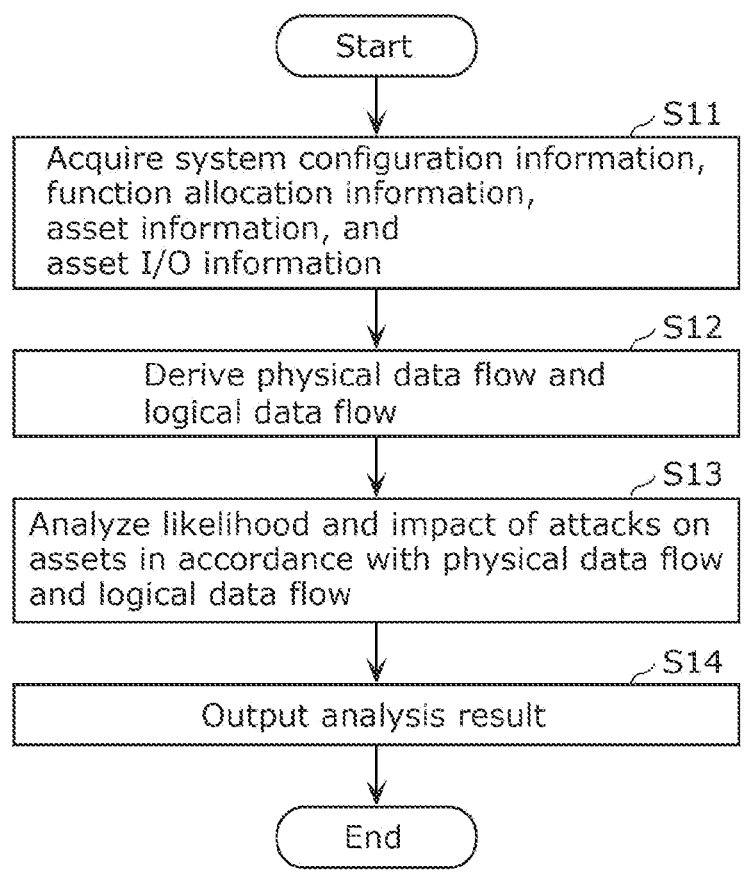

FIG. 10

| Function ID | Function name | Asset ID | Asset name | CIA classification | SFOP | Impact | Damage scenario ID | Damage scenario |
|---|---|---|---|---|---|---|---|---|
| U-1 | Remote parking | A-1 | Destination information | I | F | Major | DA-1 | (Integrity) of [destination information] is violated and Major impact (losses equivalent to vehicle price) occurs on (financial) performance. |
| U-1 | Remote parking | A-1 | Destination information | C | P | Severe | DA-2 | (Confidentiality) of [destination information] is violated and Severe impact (individual is identifiable) occurs on (privacy) performance. |
| U-1 | Remote parking | A-2 | Authentication ID | C | P | Severe | DA-3 | (Confidentiality) of [authentication ID] is violated and Severe impact (individual is identifiable) occurs on (privacy) performance. |
| U-1 | Remote parking | A-3 | Travelling trajectory | C | P | Major | DA-4 | (Confidentiality) of [travelling trajectory] is violated and Major impact (individual is identifiable) occurs on (privacy) performance. |
| U-1 | Remote parking | A-4 | Map data | C | F | Moderate | DA-5 | (Confidentiality) of [map data] is violated and Moderate impact (losses below vehicle price) occurs on (financial) performance. |
| U-1 | Remote parking | A-5 | Control data | I | S | Severe | DA-6 | (Integrity) of [control data] is violated and Severe impact (life-threatening or fatal injury (low survival rate)) occurs on (safety) performance. |
| U-1 | Remote parking | A-5 | Control data | A | O | Moderate | DA-7 | (Availability) of [control data] is violated and Moderate (partial losses of vehicle function or performance) occurs on (operational) performance. |

FIG. 11

| Asset ID | Asset name | DFD classification |
|---|---|---|
| A-1 | Destination information | Data flow |
| A-2 | Authentication ID | Data flow |
| A-3 | Travelling trajectory | Data flow |
| A-4 | Map data | Data flow |
| A-5 | Control data | Data flow |
| A-6 | Travelling information | Data flow |
| P-A-1 | Remote parking function [Main CPU] | Process |
| P-A-2 | Vehicle control function [Sub CPU] | Process |
| P-A-3 | Bluetooth function | Process |
| P-A-4 | CAN communication function | Process |
| P-A-5 | eMMC | Data store |

FIG. 12

| CIA | DFD classification | Threat scenario | STRIDE-ID |
|---|---|---|---|
| C | Process | Confidential information inside [process] is leaked out. | A-I-1 |
| C | Data flow | [Data flow] is leaked out. | S-5, I-4, I-5, A-I-2, A-I-3 |
| C | Data store | Confidential information inside [data store] is leaked out. | I-3, A-I-3 |
| I | Process | Program data of [process] is tampered with. | T-1, T-4, T-5, A-T-1 |
| I | Data flow | [Data flow] is tampered with. | T-2, T-6, A-T-2 |
| I | Data flow | False [data flow] is transmitted or received by spoofing. | S-7 |
| I | Data store | Data inside [data store] is tampered with. | T-3, A-T-2 |
| A | Process | [Process] is stopped. | D-7, D-8, A-D-1 |
| A | Data flow | Transmission and reception of [data flow] become impossible. | D-3 |
| A | Data store | [Data store] becomes unaccessible. | D-4, D-6 |

FIG. 15

| | | | Spoof | | | | | Tampering | | | | | Information leakage | | | |
|---|---|---|---|---|---|---|---|---|---|---|---|---|---|---|---|---|
| Data flow source type | Data flow destination type | Interaction | STRIDE-ID | Attack destination/target for damage | Attribute | Attack source | Threat case example | STRIDE-ID | Attack destination/target for damage | Attribute | Attack source | Threat case example | STRIDE-ID | Attack destination/target for damage | Attribute | Attack source | Threat case example |
| Normal use case | | | | | | | | | | | | | | | | | |
| Step2 Process A | Process B | Process A transmits data to process B. | , | , | , | , | , | T-1 | Process B | I | Process A | Condition of [process B] gets corrupted due to [data flow] received from [process A]. | , | , | , | , | , |
| | Data store | Process transmits data to data store. | , | , | , | , | , | T-2 | Data flow | I | Process A | Tampered [data flow] is transmitted from [process A] to [process B]. | , | , | , | , | , |
| Step3 Process | | Process receives data from data store. | , | , | , | , | , | T-3 | Data flow | I | Process | Tampered [data flow] transmitted from [process A] to [data store]. | , | , | , | , | , |
| Data store | | | , | , | , | , | , | T-4 | Data flow | I | Data store | Tampered [data flow] is transmitted from [data store] to [process]. | T-3 | Data store | C | Process | [Data flow] stored in [data store] is leaked out. |
| | Process | Process transmits data to external entity. | S-5 | Data flow | C | External entity | [External entity] is spoofed and [process] transmits [data flow] to spoofed [external entity]. | T-6 | Data flow | I | Process | [Process] transmits tampered [data flow] to [external entity]. | T-4 | Data flow | C | External entity | [Data flow] to be transmitted to [external entity] is leaked out. |
| External entity | Process | Process receives data from external entity. | S-7 | Data flow | I | External entity | [External entity] is spoofed and [process] receives false [data flow] from spoofed [external entity]. | T-5 | Process | I | External entity | Condition of [process] becomes corrupted due to [data flow] received from [external entity]. | T-5 | Data flow | C | External entity | [Data flow] received from [external entity] is leaked out. |
| Abnormal use case (attack flow from attacker) | | | | | | | | | | | | | | | | | |
| Step1 Attacker | Process | Attacker accesses process. | , | , | , | , | , | A-T-1 | Process | I | Attacker | Attacker tampers with code/data in [process]. | A-I-1 | Process | C | Attacker | Attacker listens in to confidential information in [process]. |
| Attacker | Data store | Attacker accesses data store. | , | , | , | , | , | A-T-2 | Data flow | I | Attacker | Attacker tampers [data flow] in [data store]. | A-I-2 | Data flow | C | Attacker | Attacker listens in to [data flow] in [process]. |
| | | | | | | | | | | | | | A-I-3 | Data flow | C | Attacker | Attacker listens in to [data flow] in [data store]. |

FIG. 16

| Function ID | Function name | Asset ID | Asset name | CIA classification | S | F | O | P | Impact | Damage scenario ID | Damage scenario | Threat scenario ID | Threat scenario |
|---|---|---|---|---|---|---|---|---|---|---|---|---|---|
| U-1 | Remote parking | A-1 | Parking location | I | | | F | | Major | DA-1 | (Integrity) of (parking location) is violated and Major impact (loss equivalent to vehicle price) occurs on (finance). | TH-1 | Tampering of [parking location] violates (integrity) of [parking location] and Major impact (loss equivalent to vehicle price) occurs on (finance). |

30

| Attack feasibility maximum value | High | Medium | Low | Very Low | Risk value | Risk coping method | Reason for not reducing risk | Cybersecurity goal ID | Cybersecurity goal |
|---|---|---|---|---|---|---|---|---|---|
| Medium | - | O | - | - | 3 | Reduction | - | CSG-1 | Protect from threat of tampering of [parking location]. |

FIG. 17A

| Risk matrix (property) | | | | | |
|---|---|---|---|---|---|
| | | Likelihood of attacks | | | |
| | | Very low | Low | Medium | High |
| Impact | Severe | 2 | 3 | 4 | 5 |
| | Major | 1 | 2 | 3 | 4 |
| | Moderate | 1 | 1 | 2 | 3 |
| | Negligble | 1 | 1 | 1 | 2 |

FIG. 17B

| Risk matrix (safety) | | | | | |
|---|---|---|---|---|---|
| | | Likelihood of attacks | | | |
| | | Very low | Low | Medium | High |
| Impact | Severe | 3 | 4 | 5 | 5 |
| | Major | 2 | 3 | 4 | 5 |
| | Moderate | 1 | 2 | 3 | 4 |
| | Negligble | 1 | 1 | 2 | 3 |

FIG. 17C

| Risk matrix (operability) | | | | | |
|---|---|---|---|---|---|
| | | Likelihood of attacks | | | |
| | | Very low | Low | Medium | High |
| Impact | Severe | 2 | 3 | 4 | 5 |
| | Major | 1 | 2 | 3 | 4 |
| | Moderate | 1 | 1 | 2 | 3 |
| | Negligble | 1 | 1 | 1 | 1 |

FIG. 17D

| Risk matrix (privacy) | | | | | |
|---|---|---|---|---|---|
| | | Likelihood of attacks | | | |
| | | Very low | Low | Medium | High |
| Impact | Severe | 2 | 3 | 4 | 5 |
| | Major | 1 | 2 | 3 | 4 |
| | Moderate | 1 | 1 | 1 | 1 |
| | Negligble | 1 | 1 | 1 | 1 |

THREAT ANALYSIS METHOD AND THREAT ANALYSIS SYSTEM

CROSS REFERENCE TO RELATED APPLICATIONS

This is a continuation application of PCT International Application No. PCT/JP2022/018573 filed on Apr. 22, 2022, designating the United States of America, which is based on and claims priority of Japanese Patent Application No. 2021-156545 filed on Sep. 27, 2021.

FIELD

The present disclosure relates to a threat analysis method and a threat analysis system for analyzing a threat to a system for which threat analysis is performed.

BACKGROUND

With the development of Connected, Autonomous, Shared & Services, Electric (CASE) vehicles, in-vehicle networks such as Controller Area Network (CAN) or Ethernet (registered trademark) are connected to smartphones or external servers via extra-vehicle networks such as Wi-Fi (registered trademark), Bluetooth (registered trademark), Cellular, or Vehicle-toX (V2X), and measures against threats to vehicles from the outside have become necessary. In particular, it has become important to analyze security risks by performing threat analysis in the initial stage of the vehicle development lifecycle.

For example, Patent Literature (PTL) 1 discloses a technique for extracting a source of access (transmission source of a threat) to a component of a system for which threat analysis is performed, on the basis of an assumed threat and a configuration list of components and communication paths of the system.

CITATION LIST

Patent Literature

PTL 1: Japanese Patent No. 6384465

SUMMARY

Technical Problem

The aforementioned system disclosed in PTL 1 can be improved upon.

The present disclosure provides a threat analysis method or the like capable of improving upon the above related art.

Solution to Problem

A threat analysis method according to one aspect of the present disclosure includes acquiring system configuration information, function allocation information, asset information, and asset input/output information, the system configuration information indicating hardware components of a system for which threat analysis is performed, the function allocation information indicating functions allocated to the hardware components, the asset information indicating an asset used in each of the functions, the asset input/output information indicating hardware components of input and output sources and input and output destinations of the asset among the hardware components of the system, deriving a physical data flow and a logical data flow in accordance with the system configuration information, the function allocation information, the asset information, and the asset input/output information and analyzing a likelihood of an attack on the asset and an impact of the attack on the asset for each of the hardware components and each of the functions in accordance with the physical data flow and the logical data flow, the physical data flow indicating a flow of the asset relevant to each of the hardware components, the logical data flow indicating a flow of the asset relevant to each of the functions, and outputting a result of the analyzing.

A threat analysis system according to one aspect of the present disclosure includes an acquirer that acquires system configuration information, function allocation information, asset information, and asset input/output information, the system configuration information indicating hardware components of a system for which threat analysis is performed, the function allocation information indicating functions allocated to the hardware components, the asset information indicating an asset used in each of the functions, the asset input/output information indicating hardware components of input/output sources and input/output destinations of the asset among the hardware components of the system, an analyzer that derives a physical data flow and a logical data flow in accordance with the system configuration information, the function allocation information, the asset information, and the asset input/output information and analyzes a likelihood of an attack on the asset and an impact of the attack on the asset for each of the hardware components and each of the functions in accordance with the physical data flow and the logical data flow, the physical data flow indicating a flow of the asset relevant to each of the hardware components, the logical data flow indicating a flow of the asset relevant to each of the functions, and an output unit that outputs a result of the analyzing.

It is to be noted that these generic or specific aspects of the present disclosure may be implemented or realized as a system, a method, an integrated circuit, a computer program, or a computer-readable recording medium such as a CD-ROM, or may be implemented or realized as an arbitrary combination of a system, a method, an integrated circuit, a computer program, or a recording medium. The recording medium may be a non-transitory recording medium.

Advantageous Effects of Invention

The threat analysis method or the like according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

FIG. 3 is a diagram showing one example of function allocation information.

FIG. 4 is a diagram showing one example of asset information.

FIG. 6A is a diagram showing one example of attack likelihood assessment criteria.

FIG. 6B is a diagram showing another example of attack likelihood assessment criteria.

FIG. 7 is a flowchart showing one example of a threat analysis method according to an embodiment.

FIG. 10 is a diagram showing one example of damage scenarios produced according to confidentiality integrity availability (CIA) classification.

FIG. 11 is a diagram showing one example of data flow diagram (DFD) classification.

FIG. 12 is a diagram showing one example of threat scenarios produced according to the CIA classification and the DFD classification.

FIG. 15 is a diagram showing one example of threat case examples embodied from the routes of attacks.

FIG. 16 is a diagram showing one example of an analysis result.

FIG. 17A is a diagram for describing a method of calculating a risk value.

FIG. 17B is a diagram for describing the method of calculating a risk value.

FIG. 17C is a diagram for describing the method of calculating a risk value.

FIG. 17D is a diagram for describing the method of calculating a risk value.

DESCRIPTION OF EMBODIMENT

Figure 1:
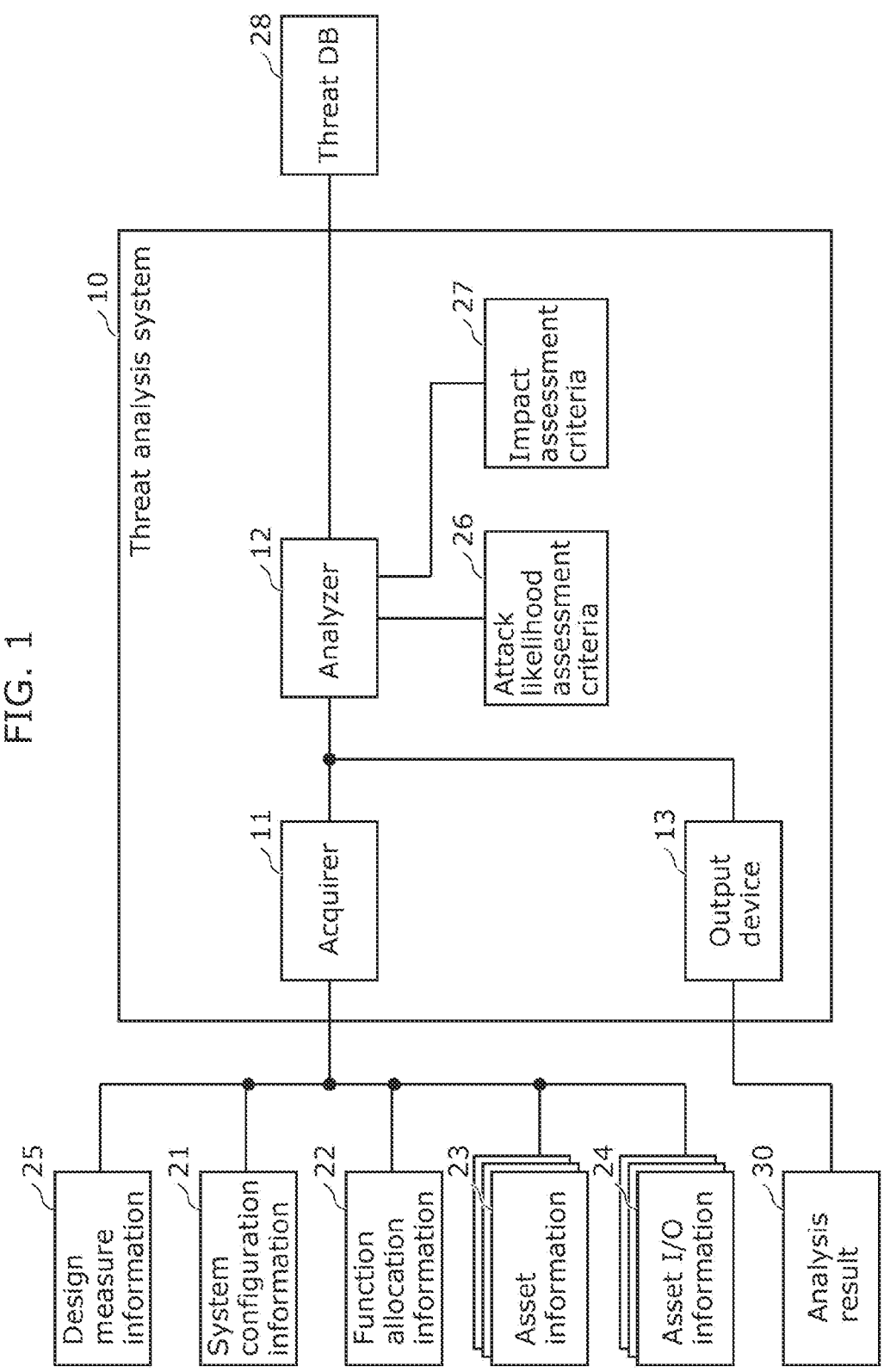
FIG. 1 is a block diagram showing one example of a configuration of a threat analysis system according to an embodiment.

In the case of assuming a malicious attack resulting from downloading or execution of an unauthorized 3rd party application, unauthorized access may be made from a logical session established by hardware between a vehicle and external connection equipment unlike in the case of a conventional physical session via hardware components and their communication paths. Thus, it may become difficult to perform accurate security risk analysis with the aforementioned technique disclosed in PTL 1.

In view of this, a threat analysis method or the like that enable accurate security risk analysis will be described hereinafter.

A threat analysis method according to one aspect of the present disclosure includes acquiring system configuration information, function allocation information, asset information, and asset input/output information, the system configuration information indicating hardware components of a system for which threat analysis is performed, the function allocation information indicating functions allocated to the hardware components, the asset information indicating an asset used in each of the functions, the asset input/output information indicating hardware components of input and output sources and input and output destinations of the asset among the hardware components of the system, deriving a physical data flow and a logical data flow in accordance with the system configuration information, the function allocation information, the asset information, and the asset input/output information and analyzing a likelihood of an attack on the asset and an impact of the attack on the asset for each of the hardware components and each of the functions in accordance with the physical data flow and the logical data flow, the physical data flow indicating a flow of the asset relevant to each of the hardware components, the logical data flow indicating a flow of the asset relevant to each of the functions, and outputting a result of the analyzing.

According to this method, in addition to the physical data flow of the asset relevant to the hardware component, the logical data flow of the asset relevant to the function allocated to the hardware component is also used as a basis to analyze the attack on the asset or, in other words, to analyze security risks. Thus, even in the case of assuming an attack resulting from downloading of an unauthorized 3rd party application, it is possible to grasp threats that may be caused by unauthorized access from logical sessions and to accurately analyze security risks. For example, threats can be extracted comprehensively at a function level of a product. Besides, unnecessary route analysis can be eliminated by identifying the travel route of an asset for each function from the logical data flow.

For example, the analyzing may be performed in accordance with an attack likelihood assessment criterion for assessing the likelihood of the attack on the asset, the attack likelihood assessment criterion being defined for each of the hardware components and each of the functions. Using the attack likelihood assessment criterion for assessing the likelihood of the attack on the asset allows more accurate analysis of the likelihood of the attack on the asset.

For example, the attack likelihood assessment criterion may be defined based on design measure information indicating a measure applied to each of the hardware components and each of the functions.

For example, hardware components and functions for which measures against attacks have been taken may be analyzed as being less likely to be attacked, whereas hardware components and functions for which insufficient measures against attacks are taken may be analyzed as being highly likely to be attacked.

For example, the analyzing may be performed based on an impact assessment criterion for assessing the impact of the attack on the asset, the impact assessment criterion being defined for each of the hardware components and each of the functions.

Using the impact assessment criterion for assessing the impact of the attack on the asset allows more accurate analysis of the impact of the attack on the asset.

For example, the analyzing further may include generating a damage scenario or a threat scenario in accordance with a predetermined database and a property of the asset for each of the hardware components and each of the functions, and the result of the analyzing may include the damage scenario or the threat scenario generated for each of the hardware components and each of the functions.

For example, a damage scenario or a threat scenario can be generated for each of categories including safety, financial, operational, and privacy by, for example, collating a STRIDE threat analysis model with a predetermined database according to CIA or DFD classification of assets as asset properties.

For example, the analyzing may include identifying an attack route to the asset in the physical data flow and the logical data flow in accordance with the physical data flow and the logical data flow and performing the analyzing in accordance with the attack route.

Identifying the attack route allows more accurate analysis of security risks. For example, it is possible to embody a threat case example.

For example, the result of the analyzing may include a risk value that indicates a risk of the attack on the asset.

In this way, the result of the analysis may be indicated by the risk value (numeric value), and this facilitates determination of security risks.

A threat analysis system according to one embodiment of the present disclosure includes an acquirer that acquires system configuration information, function allocation information, asset information, and asset input/output information, the system configuration information indicating hardware components of a system for which threat analysis is performed, the function allocation information indicating functions allocated to the hardware components, the asset information indicating an asset used in each of the functions, the asset input/output information indicating hardware components of input/output sources and input/output destinations of the asset among the hardware components of the system, an analyzer that derives a physical data flow and a logical data flow in accordance with the system configuration information, the function allocation information, the asset information, and the asset input/output information and analyzes a likelihood of an attack on the asset and an impact of the attack on the asset for each of the hardware components and each of the functions in accordance with the physical data flow and the logical data flow, the physical data flow indicating a flow of the asset relevant to each of the hardware components, the logical data flow indicating a flow of the asset relevant to each of the functions, and an output unit that outputs a result of the analyzing.

Accordingly, it is possible to provide a threat analysis system capable of accurately analyzing security risks.

Hereinafter, an embodiment will be described specifically with reference to the drawings.

The embodiment described below illustrates one generic or specific example of the present disclosure. Numerical values, shapes, materials, constituent elements, arrangement positions of the constituent elements, connection forms of the constituent elements, steps, a sequence of steps, and so on in the following embodiment are merely illustrative examples and do not intend to limit the scope of the present disclosure.

Embodiment

A threat analysis method and a threat analysis system according to an embodiment will be described with reference to FIGS. 1 to 17D.

FIG. 1 is a block diagram showing one example of a configuration of threat analysis system 10 according to an embodiment.

Threat analysis system 10 is a system for analyzing a threat to a system for which threat analysis is performed. For example, the system for which threat analysis is performed may be a system that is relevant to on-vehicle networks or the like and includes electronic control units (ECUs) and equipment connected to the ECUs.

Threat analysis system 10 includes acquirer 11, analyzer 12, and output unit 13. Threat analysis system 10 further includes memory that stores attack likelihood assessment criteria 26 and impact assessment criteria 27. Threat analysis system 10 is a computer that may include, for example, a processor (central processing unit: CPU) and memory. For example, the memory may be read only memory (ROM) or random access memory (RAM) and is capable of storing programs to be executed by the processor. Acquirer 11, analyzer 12, and output unit 13 may be implemented or realized as, for example, a processor that executes programs stored in the memory. Note that the memory for storing programs may be different from the memory for storing attack likelihood assessment criteria 26 and impact assessment criteria 27. The constituent elements of threat analysis system 10 may be arranged in a single casing, or threat analysis system 10 may configure an apparatus. The constituent elements of threat analysis system 10 may also be dispersed and arranged in a plurality of casings (apparatuses). For example, threat analysis system 10 may serve as a server.

Acquirer 11 acquires system configuration information 21, function allocation information 22, asset information 23, asset input/output information 24, and design measure information 25. For example, threat analysis system 10 may include an input interface (I/F), and acquirer 11 may receive input of system configuration information 21, function allocation information 22, asset information 23, asset input/output information 24, and design measure information 25 via the input I/F to acquire these pieces of information. Threat analysis system 10 may further include a communication I/F, and acquirer 11 may acquire system configuration information 21, function allocation information 22, asset information 23, asset input/output information 24, and design measure information 25 via the communication I/F. Threat analysis system 10 may also store system configuration information 21, function allocation information 22, asset information 23, asset input/output information 24, and design measure information 25 in the memory, and acquirer 11 may acquire system configuration information 21, function allocation information 22, asset information 23, asset input/output information 24, and design measure information 25 from the memory.

System configuration information 21 is information indicating hardware components of a system for which threat analysis is performed. System configuration information 21 is described with reference to FIG. 2.

Figure 2:
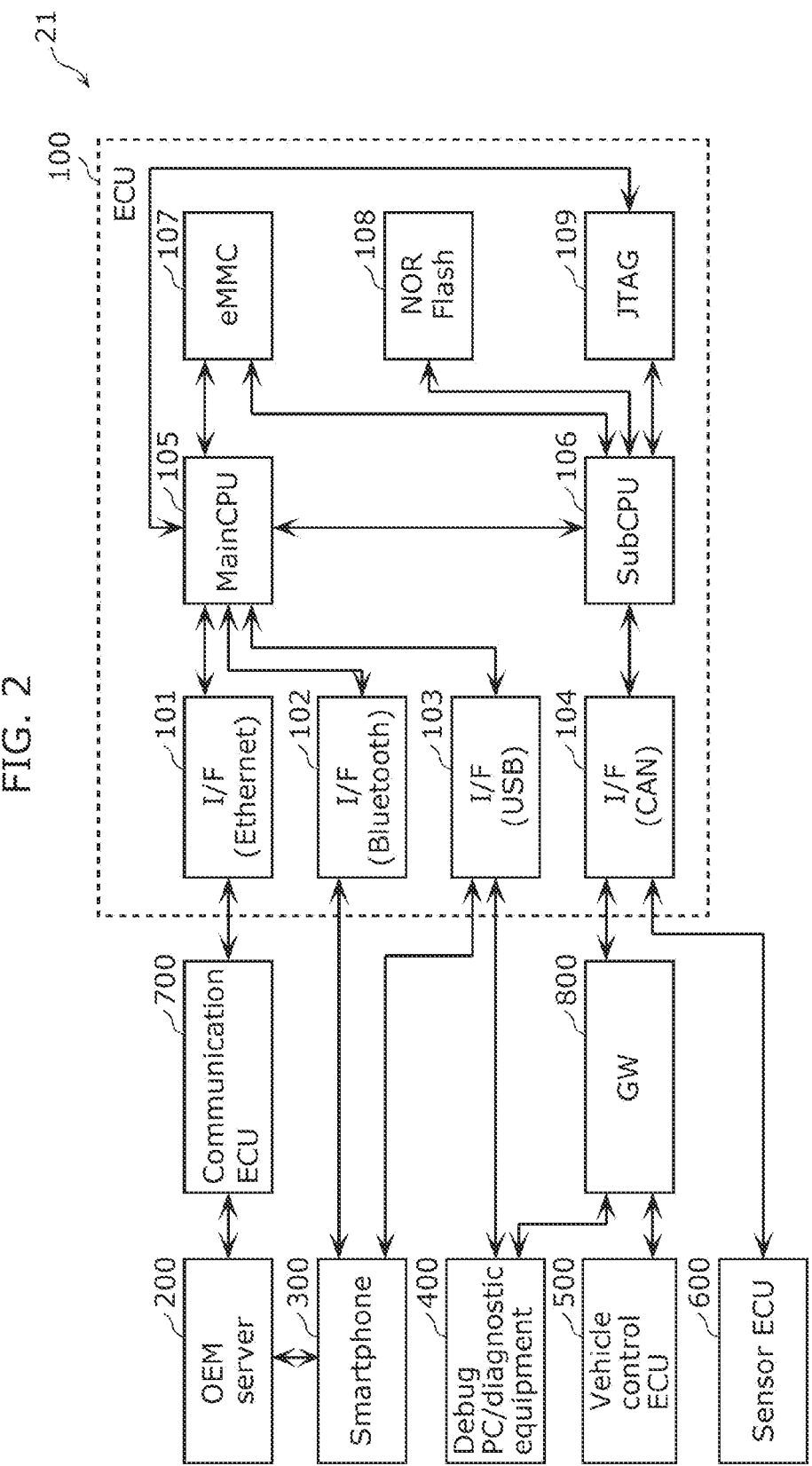
FIG. 2 is a block diagram showing one example of hardware components indicated by system configuration information.

FIG. 2 is a block diagram showing one example of the hardware components indicated by system configuration information 21.

For example, FIG. 2 shows system configuration information 21 relevant to ECU 100. As hardware components, system configuration information 21 may include, for example, ECU 100, original equipment manufacturer (OEM) server 200 that is communicably connected to ECU 100, smartphone 300 (e.g., a smartphone of a user within a vehicle equipped with ECU 100), debug PC/diagnostic equipment 400, vehicle control ECU 500, sensor ECU 600, communication ECU 700 that carries out communication between ECU 100 and OEM server 200, and gateway (GW) 800 that carries out communication between ECU 100 and sensor ECU 600. ECU 100 includes, as hardware components, Ethernet I/F 101, Bluetooth I/F 102, universal serial bus (USB) I/F 103, CAN I/F 104, Main CPU 105, Sub-CPU 106, embedded multimedia card (eMMC) 107, NOR Flash 108, and joint test action group (JTAG) 109.

System configuration information 21 further includes information indicating a connection relationship of the hardware components. In ECU 100, Main CPU 105 is connected to I/F 101, I/F 102, I/F 103, Sub-CPU 106, eMMC 107, and JTAG 109, and Sub-CPU 106 is connected to I/F 104, Main CPU 105, eMMC 107, NOR Flash 108, and JTAG 109. I/F 101 may be connected to, for example, OEM server 200 by remote wireless communication via communication ECU 700 and may further be connected to, for example, smartphone 300 by remote wireless communication via OEM server 200. I/F 102 may be connected to, for example, smartphone 300 by proximity wireless communication. I/F 103 may be directly connected to, for example, smartphone 300 and debug PC/diagnostic equipment 400. I/F 104 may be connected to, for example, debug PC/diagnostic equipment 400 and vehicle control ECU 500 via GW 800 and may also be connected to sensor ECU 600.

System configuration information 21 may be used to identify the route of entry of an attack. For example, it is possible to identify the route of unauthorized entry via OEM server 200, communication ECU 700, and I/F 101, the route of unauthorized entry via GW 800 and I/F 104, the route of unauthorized entry via sensor ECU 600 and I/F 104, and the route of direct unauthorized entry into ECU 100 via I/F 102 or 103.

Function allocation information 22 is information indicating functions (application functions) allocated to the hardware components. Function allocation information 22 is described with reference to FIG. 3.

FIG. 3 is a diagram showing one example of function allocation information 22.

For example, Main CPU 105 configures virtual machines (VMs) 105a and 105b. For example, function allocation information 22 indicates that a remote parking function is allocated to VM 105a of Main CPU 105, an application adding function and a reproductive function are allocated to VM 105b of Main CPU 105, and a vehicle control function and a DIAG function are allocated to Sub-CPU 106. Function allocation information 22 may further include information indicating virtualization, logical functional partitioning using container technology, or CPU-based execution environment partitioning using technology such as TrustZone, HyperVisior, or docker in one CPU. For example, attack likelihood assessment criteria 26 described later may be determined based on such information indicating logical functional partitioning.

Asset information 23 is information indicating assets used in the functions allocated to the hardware components. Asset information 23 is described with reference to FIG. 4.

FIG. 4 is a diagram showing one example of asset information 23. Although impact assessment criteria 27 are also shown in FIG. 4, impact assessment criteria 27 will be described later.

For example, FIG. 4 shows a parking location and authentication information as assets used in the remote parking function. Although not shown, assets such as destination information, a travelling trajectory, a control message, travelling information, and sensor information are also used in the remote parking function. While asset information 23 indicating the assets used in the remote parking function is shown herein, there is also asset information 23 used in the other functions (the application adding function, the reproductive function, the vehicle control function, and the DIAG function).

Asset input/output information 24 is information indicating hardware components of input/output sources and input/output destinations of the assets. Asset input/output information 24 is described with reference to FIG. 5. Note that the input/output sources refer to an input source and an output source, and the input/output destinations refer to an input destination and an output destination.

Figure 5:
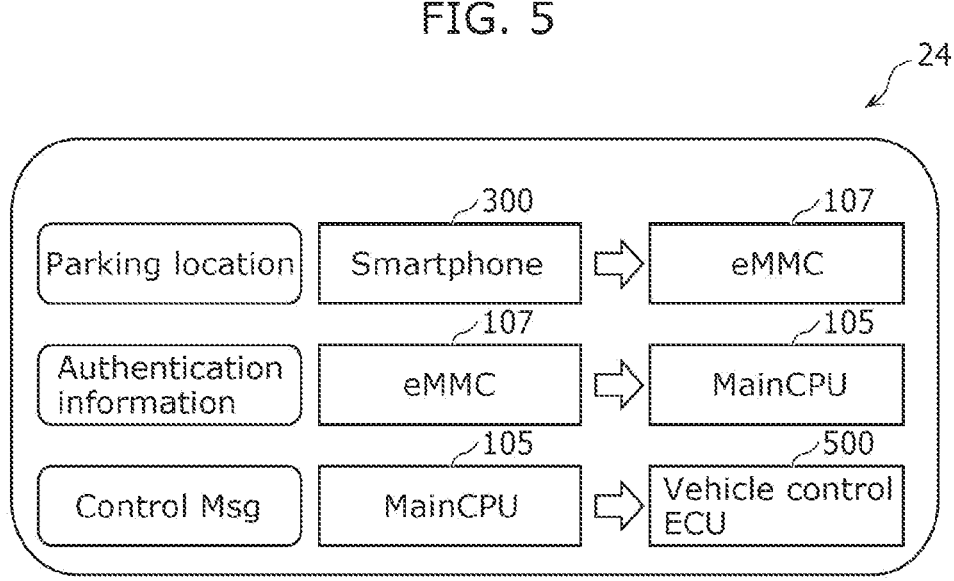
FIG. 5 is a diagram showing one example of asset input/output information.

FIG. 5 is a diagram showing one example of asset input/output information 24. As one example of the assets, a parking location, authentication information, and a control message are shown in FIG. 5.

Referring to, for example, the parking location, the hardware component of the input source is smartphone 300 and the hardware component of the input destination is eMMC 107, so that the parking location is input from smartphone 300 to eMMC 107. Referring to the authentication information, the hardware component of the output source is eMMC 107 and the hardware component of the output destination is Main CPU 105, so that the authentication information is output from eMMC 107 to Main CPU 105. Referring to the control message, the hardware component of the output source is Main CPU 105 and the hardware component of the output destination is vehicle control ECU 500, so that the control message is output from Main CPU 105 to vehicle control ECU 500. In this way, asset input/output information 24 includes information indicating, for example, the hardware components of the input source and the input destination or the hardware components of the output source and the output destination for each asset.

Design measure information 25 is information indicating measures adopted for each hardware component and each function. For example, the hardware components may adopt measures such as application Firewall, sandbox, forced access control, a host-based intrusion detection system (HIDS), or a network-based intrusion detection system (NIDS). For example, the functions may adopt measures such as encryption of the assets, verification of correctness using hash values, and memory access control. For example, attack likelihood assessment criteria 26 described later may be determined based on design measure information 25.

Referring back to the description of FIG. 1, analyzer 12 derives a physical data flow that indicates the flow of assets relevant to the hardware components and a logical data flow that indicates the flow of assets relevant to the functions, in accordance with system configuration information 21, function allocation information 22, asset information 23, and asset input/output information 24. Then, analyzer 12 analyzes the likelihood of attacks on the assets and the impact of the attacks on the assets for each hardware component and each function in accordance with the derived physical and logical data flows. For example, analyzer 12 may further use attack likelihood assessment criteria 26, impact assessment criteria 27, or threat DB 28 to perform the above analysis. Details of operations of analyzer 12 will be described later.

Output unit 13 outputs the result of the analysis performed by analyzer 12. Examples of the result of the analysis (analysis result 30) to be output will be described later.

Attack likelihood assessment criteria 26 are criteria for assessing the likelihood of attacks on the assets, determined for each hardware component and each function. Attack likelihood assessment criteria 26 is described with reference to FIGS. 6A and 6B.

FIGS. 6A and 6B are diagrams showing one example of attack likelihood assessment criteria 26. FIG. 6A shows attack likelihood assessment criteria 26 determined for each function, and FIG. 6B shows attack likelihood assessment criteria 26 determined for each hardware component. The likelihood of attacks is assessed at four stages (High, Medium, Low, and Very low) defined in advance.

FIG. 6A shows the likelihoods of attacks on the assets used in the remote parking function, the application adding function, the reproductive function, the vehicle control function, and the DIAG function. For example, the likelihood of attacks on the assets used in the application adding function is set to High because this function involves logical connection (session establishment) with outside sources. For example, the likelihood of attacks on the assets used in the reproductive function is set to Medium because this function includes an intrusion detection function. For example, the likelihoods of attacks on the assets used in the remote parking function and the DIAG function are set to Low because these functions include an anti-intrusion function. For example, the likelihood of attacks on the assets used in the vehicle control function is set to Very low because this function does not involve logical connection with outside sources.

FIG. 6B shows the likelihoods of attacks on the assets used in hardware components (e.g., I/F 101) having remote wireless entry points, hardware components (e.g., I/F 102) having proximity wireless entry points, hardware components (e.g., I/F 103 and I/F 104) having direct connection entry points, and hardware components (e.g., Main CPU 105 and Sub-CPU 106) having physical connection entry points. For example, the likelihood of attacks on the assets used in the hardware components with remote wireless entry points are set to High because attacks on these hardware components are readily feasible. For example, the likelihood of attacks on the assets used in the hardware component with proximity wireless entry points are set to Medium because excessive efforts are necessary to realize the attacks. For example, the likelihood of attacks on the assets used in the hardware components with direct connection entry points is set to Low because enormous efforts are necessary to realize the attacks. For example, the likelihood of attacks on the assets used in the hardware components with physical connection entry points is set to Very low because attacks on these hardware components are almost impossible.

Note that attack likelihood assessment criteria 26 may be determined based on design measure information 25. For example, criteria that reduce the likelihood of attacks may be determined for functions and hardware components that adopt measures against attacks, and criteria that increase the likelihood of attacks may be determined for functions and hardware components that adopt no measures against attacks.

Attack likelihood assessment criteria 26 determined for each function may be based on the information included in function allocation information 22 and indicating logical functional partitioning. For example, criteria that reduce the likelihood of attacks may be determined for functions that involve logical functional partitioning, and criteria that increase the likelihood of attacks may be determined for functions that do not involve logical functional partitioning.

Impact assessment criteria 27 are criteria for assessing the impact of attacks on the assets, determined for each hardware component and each function. Impact assessment criteria 27 is described with reference to FIG. 4.

Impact assessment criteria 27 shown in FIG. 4 indicate the direct impact of attacks on assets at the time of security violations, determined for the remote parking function using the parking location and the authentication information. Specifically, in the case where there is an attack on the parking location used in the remote parking function, the impact of the attack is assessed at four stages (Severe, Major, Moderate, and Negligible) defined in advance in terms of four standpoints including safety, financial, operational, and privacy. For example, in the case where there is an attack on the parking location used in the remote parking function, assessments are made such that the impact from the standpoint of safety is set to Negligible and neither the function nor the performance of the vehicle is affected; the impact from the operational standpoint is set to Major and losses equivalent to the vehicle price are produced; the impact from the standpoint of operability is set to Negligible and neither the function nor the performance of the vehicle is affected; and the impact from the standpoint of privacy is set to Severe and the parking location is regarded as information that allows identification of an individual.

Threat DB 28 is a predetermined database used for threat analysis. For example, threat DB 28 may be a STRIDE threat analysis model espoused by Microsoft Cooperation (registered trademark). Although details of the database will be described later, analyzer 12 generates a damage scenario or threat scenario for each hardware component and each function in accordance with threat DB 28 and asset properties.

Next, operations of threat analysis system 10 will be described with reference to FIG. 7.

FIG. 7 is a flowchart showing one example of the threat analysis method according to the embodiment. Since the threat analysis method is executed by threat analysis system 10, FIG. 7 can also be said as a flowchart showing one example of the operations of threat analysis system 10 according to the embodiment.

First, acquirer 11 acquires system configuration information 21 that indicates the hardware components of a system for which threat analysis is performed, function allocation information 22 that indicates functions allocated to the hardware components, asset information 23 that indicates assets used in the functions, and asset input/output information 24 that indicates the hardware components of input/output sources and input/output destinations of the assets (step S11: acquisition step).

Next, analyzer 12 derives a physical data flow that indicates the flow of an asset relevant to a hardware component and a logical data flow that indicates the flow of an asset relevant to a function in accordance with system configuration information 21, function allocation information 22, asset information 23, and asset input/output information 24 (step S12: analysis step). One example of the physical data flow is shown in FIG. 8, and one example of the logical data flow is show in FIG. 9.

Figure 8:
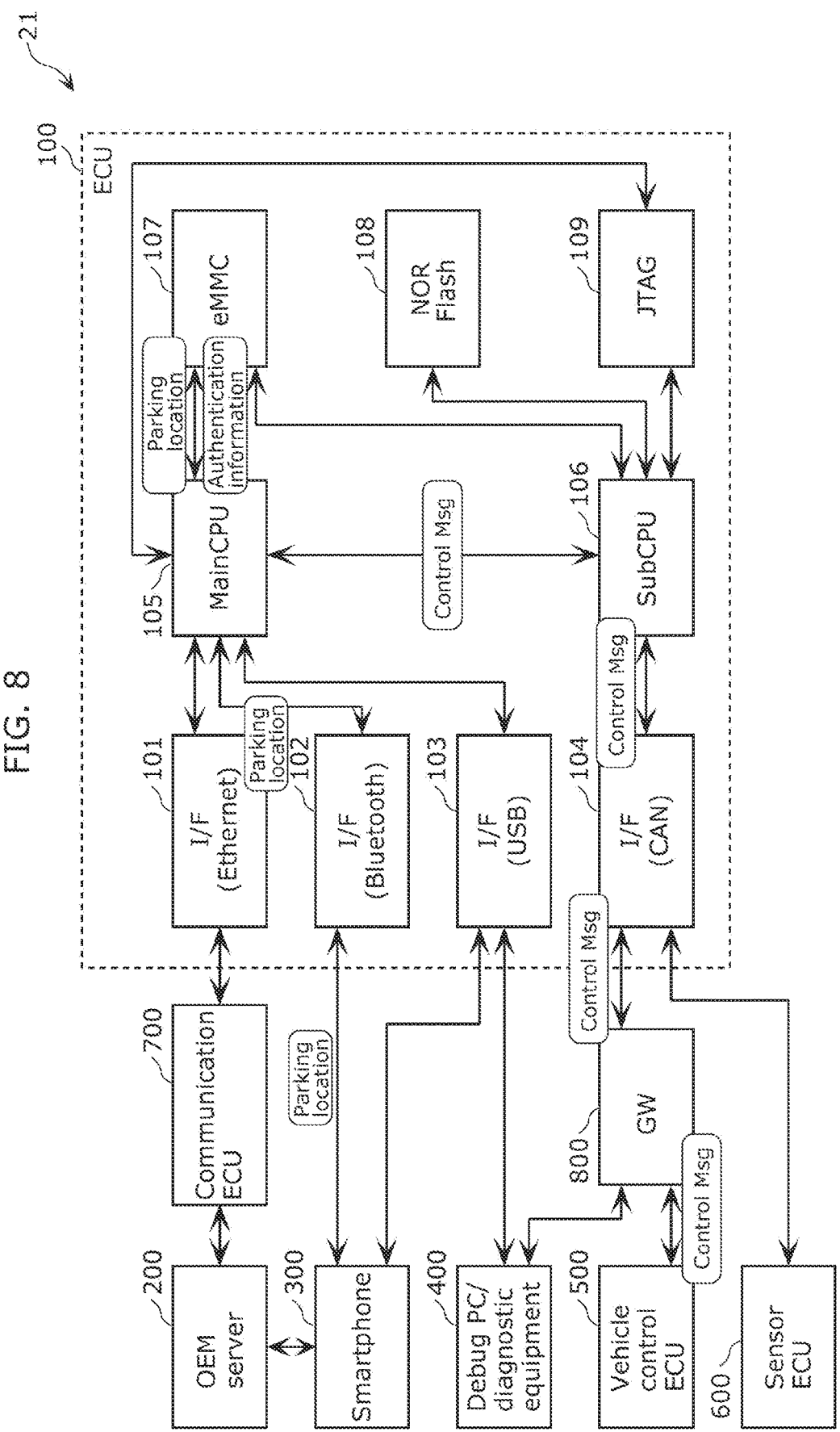
FIG. 8 is a diagram showing one example of a physical data flow.

FIG. 8 is a diagram showing one example of the physical data flow.

Figure 9:
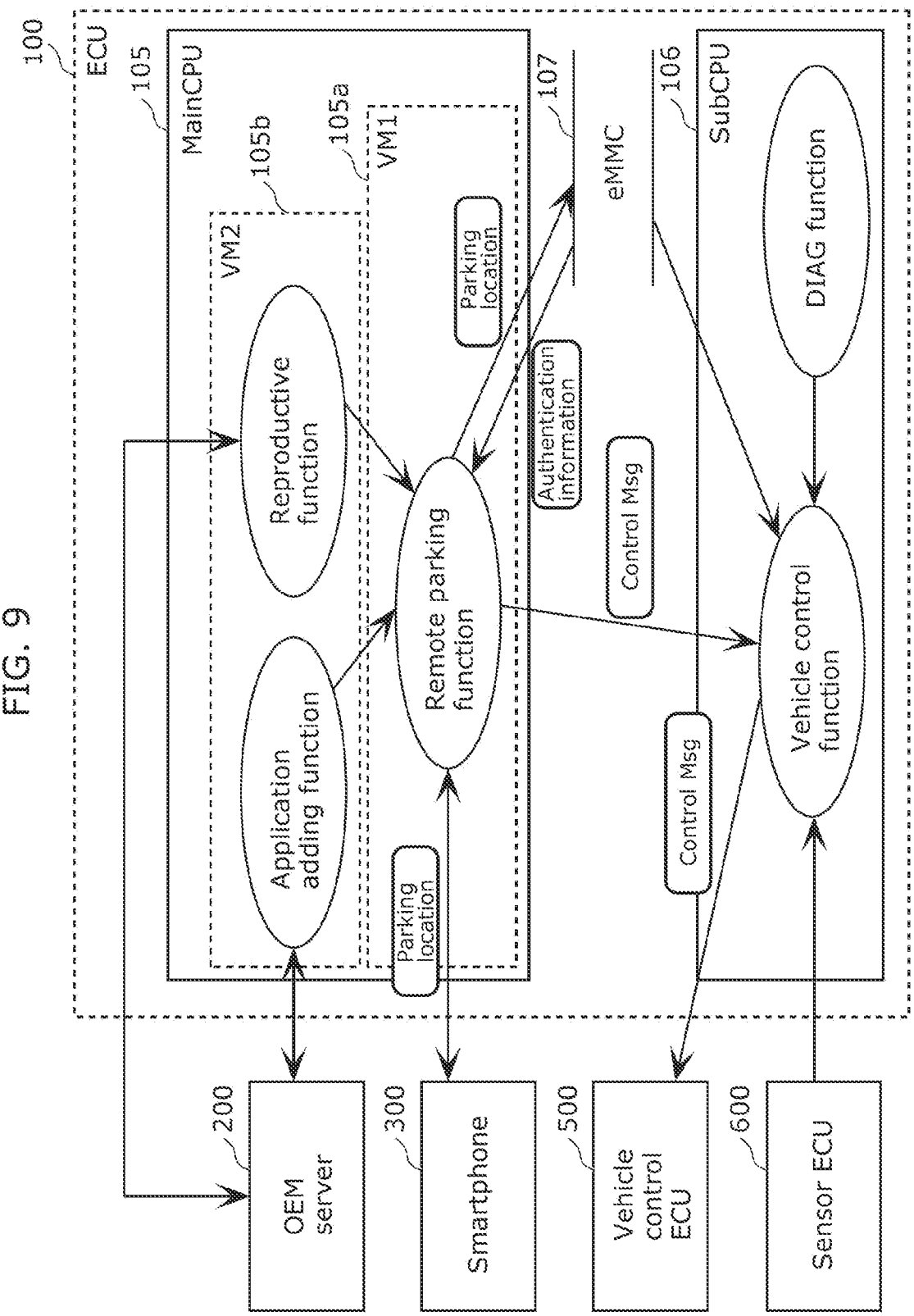
FIG. 9 is a diagram showing one example of a logical data flow.

FIG. 9 is a diagram showing one example of the logical data flow.

As one example of the physical data flow, FIG. 8 shows the flows of a parking location, authentication information, and a control message that are relevant to the hardware components shown in FIG. 2. For example, the parking location may flow from smartphone 300 to eMMC 107 via I/F 102 and Main CPU 105. For example, the authentication information may flow from eMMC 107 to Main CPU 105. For example, the control message may flow from Main CPU 105 to vehicle control ECU 500 via Sub-CPU 106, I/F 104, and GW 800.

As one example of the logical data flow, FIG. 9 shows the flows of the parking location, the authentication information, and the control message that relevant to the functions shown in FIG. 3. For example, the parking location may flow from smartphone 300 to eMMC 107 via the remote parking function. For example, the authentication information may flow from eMMC 107 to the remote parking function. For example, the control message may flow from the remote parking function to vehicle control ECU 500 via the vehicle control function. Although not shown, the other flows such as the flow from the application adding function to the remote parking function, the flow from the reproductive function to the remote parking function, the flow from eMMC 107 to the vehicle control function, the flow from the DIAG function to the vehicle control function, and the flow from sensor ECU 600 to the vehicle control function indicate the flows of different assets. It can be seen from this logical data flow that the remote parking function may also possibly be controlled separately via VM communication from other functions connected to OEM server 200 or the like, such as the application adding function or the reproductive function, and therefore it is necessary to analyze the remote parking function together with impacts that may be caused in the case where there is an unauthorized entry from a logic session established by the application adding function or the reproductive function.

Information on hardware components, functions, assets, and the input/output sources and destinations of the assets for each data flow is included in system configuration information 21, function allocation information 22, asset information 23, and asset input/output information 24. Thus, analyzer 12 is capable of deriving the physical data flow and the logical data flow on the basis of the above information.

For example, the physical data flow may be the flow of data under the transport layer in the TCP/IP protocol suite, and the logical data flow may be the flow of data in the application layer in the TCP/IP protocol suite (a layer in or above the session layer of the OSI reference model).

Next, analyzer 12 analyzes the likelihood and impact of an attack on an asset for each hardware component and each function in accordance with the derived physical and logical data flows (step S13: analysis step).

For example, analyzer 12 may perform the analysis on the basis of attack likelihood assessment criteria 26. For example, a hardware component or function that is classified as High according to attack likelihood assessment criteria 26 can be analyzed as having a high likelihood of being attacked, and a hardware component or function that is classified as Very low or Low according to attack likelihood assessment criteria 26 is Very low or Low can be analyzed as having a low likelihood of being attacked.

Note that analyzer 12 does not need to perform analysis for hardware components and functions that are classified as Very low according to attack likelihood assessment criteria 26.

For example, analyzer 12 may perform the analysis on the basis of impact assessment criteria 27. A hardware component or function that is classified as Major or Severe according to impact assessment criteria 27 can be analyzed as suffering a great impact from an attack made thereon, and a hardware component or function that is classified as Negligible according to impact assessment criteria 27 can be analyzed as suffering only a small impact from an attack made thereon. At this time, analyzer 12 may analyze this impact in terms of the standpoints of safety, financial, operational, and privacy as shown in FIG. 4.

Moreover, for example, analyzer 12 may generate damage scenarios or threat scenarios for each hardware component and each function in accordance with a predetermined database (e.g., threat DB 28) and asset properties. This is described with reference to FIGS. 10 to 12.

FIG. 10 is a diagram showing one example of damage scenarios generated according to CIA classification.

The asset properties can be classified into Confidentiality, Integrity, and Availability according to the CIA classification. FIG. 10 shows threat DB 28 that associates the CIA classification and damage scenarios for assets (assets used in the remote parking function). The damage scenarios can be generated by collating the asset properties (CIA classification) with threat DB 28. For example, destination information has impact on Integrity (I) and Confidentiality (C) according to the CIA classification and is thus divided into multiple rows for each category of the CIA classification.

Then, on the basis of an impact evaluation value (Impact) of each category of safety, financial, operational, and privacy (SFOP), a damage scenario stating that "Integrity of destination information is violated and Major impact (losses equivalent to vehicle price) occurs on financial performance" is generated for Integrity, and a damage scenario stating that "Confidentiality of destination information is violated and Severe impact (individual is identifiable) occurs on privacy performance" is generated for confidentiality of the destination information.

FIG. 11 is a diagram showing one example of the DFD classification.

The asset properties can be classified into "Data flow" according to the DFD classification. Note that the functions can be classified into "Process" according to the DFD classification, and the memory can be classified into "Data store" according to the DFD classification. It can be seen from FIG. 11 that the destination information, the authentication ID (authentication information), the travelling trajectory, the map data, the control data, and the travelling information, which serve as the assets, are classified into "Data flow".

FIG. 12 is a diagram showing one example of threat scenarios generated according to the CIA classification and the DFD classification.

FIG. 12 shows threat DB 28 that associates combinations of the CIA classification and the DFD classification with threat scenarios. In the threat scenarios, [process] describes the function name, [data flow] describes the asset name, and [data store] describes the memory name. For example, for integrity of the destination information, a row with the CIA classification of "I" and the DFD classification of "data flow" in FIG. 12 is referenced to in order to generate a threat scenario stating that "Destination information is tampered with." or "Spoofed destination information is transmitted or received." can be generated.

In step S13, for example, analyzer 12 may identify the route of an attack on an asset in the physical data flow and the logical data flow in accordance with the physical data flow and the logical data flow and may perform analysis in accordance with the identified route of the attack. This is described with reference to FIGS. 13 to 15.

Figure 13:
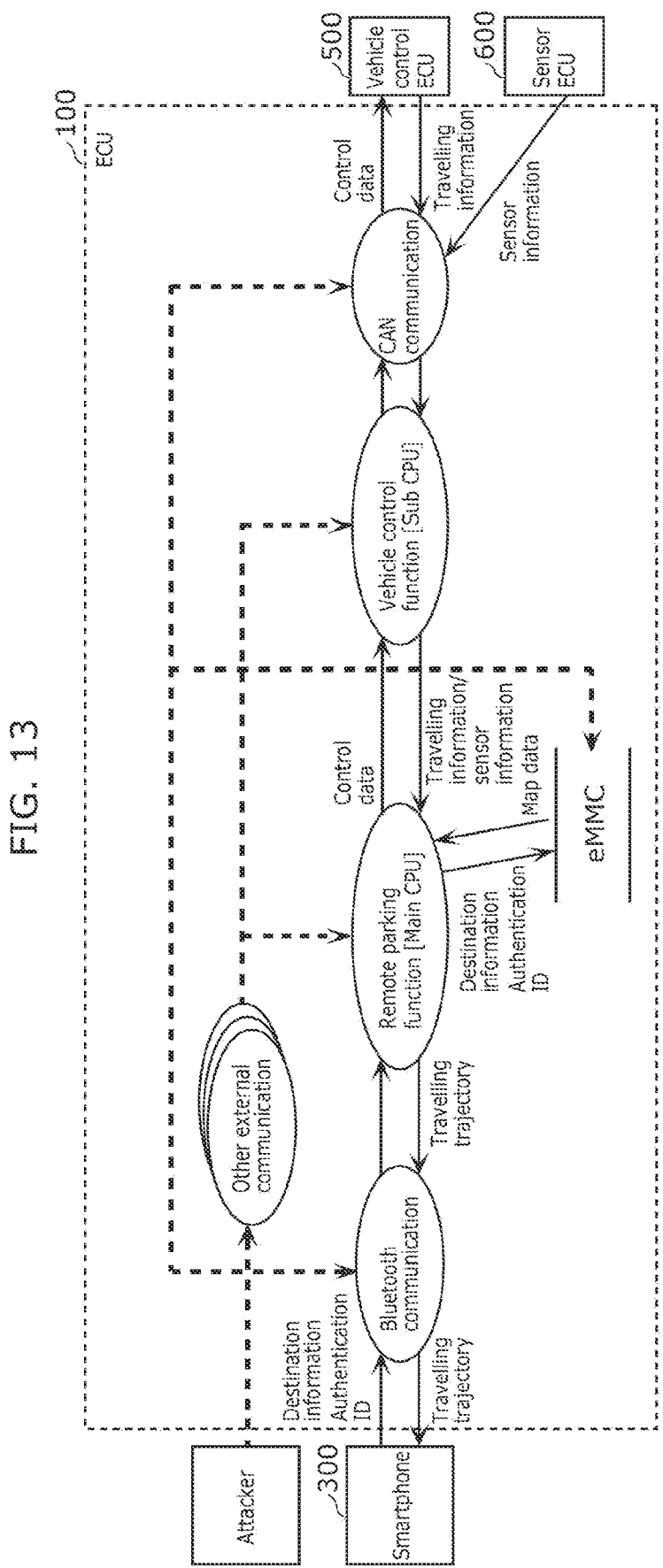
FIG. 13 is a diagram showing one example of the route of unauthorized entry to a hardware component or a function in the physical data flow and the logical data flow.

FIG. 13 is a diagram showing one example of the routes of unauthorized entries into hardware components or functions in the physical data flow and the logical data flow. FIG. 13 shows the routes of unauthorized entries in the physical data flow and the logical data flow that focus on the remote parking function. Here, a large number of other external communication functions that may have impact on the remote parking function of Main CPU 105, including the application adding function and the reproductive function, are collectively described as other external communication to simplify the data flows.

Examples of the route of unauthorized entries by attackers include the routes of unauthorized entries into I/F 102 via Bluetooth communication, the routes of unauthorized entries into I/F 104 via CAN communication, the routes of unauthorized entries into I/F 101 via other external communication, the routes of unauthorized entries into Main CPU 105 and Sub-CPU 106 from I/F 101, and the routes of unauthorized entries into eMMC 107.

Figure 14:
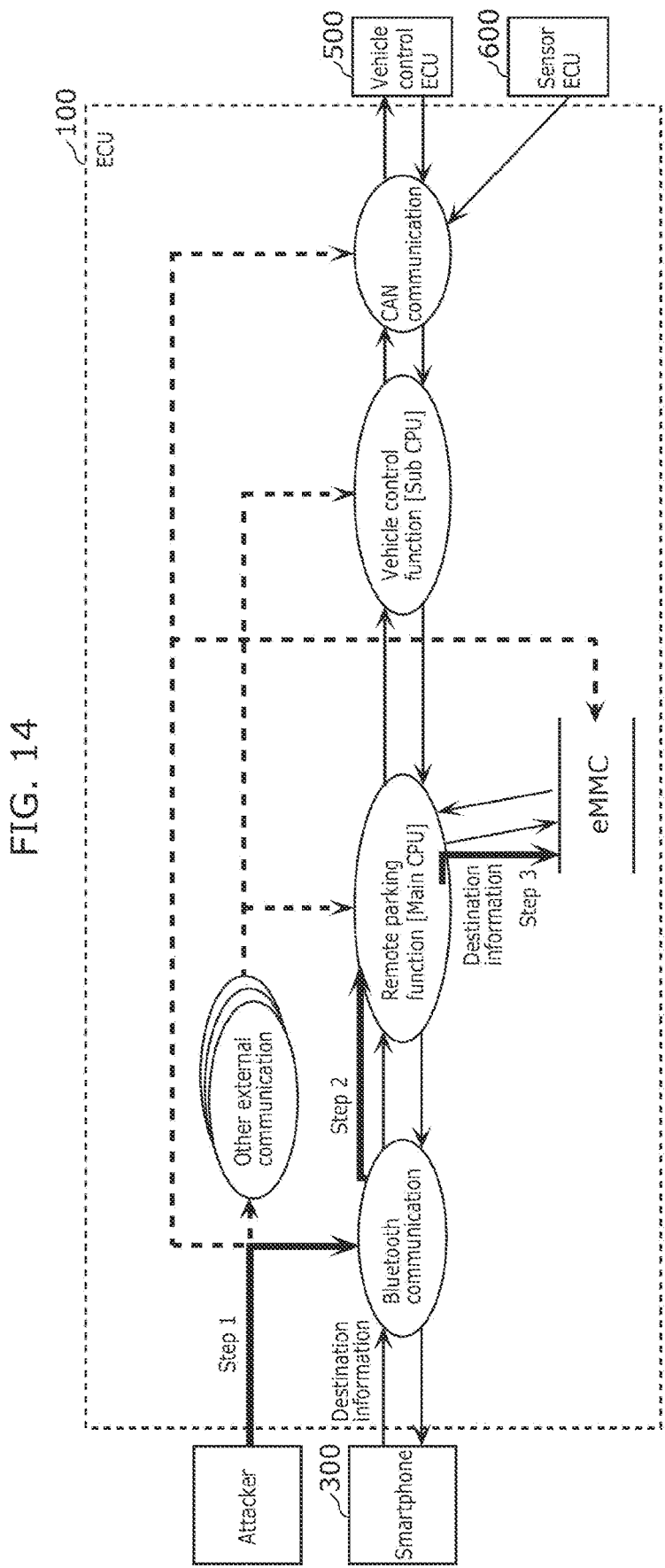
FIG. 14 is a diagram showing one example of the route of an attack on destination information in the physical data flow and the logical data flow.

FIG. 14 is a diagram showing one example of the route of an attack on the destination information in the physical data flow and the logical data flow.

For example, when the destination information among the assets is focused on, an attacker is assumed to make an attack by the route of an unauthorized entry (attack route)

shown in Step1, the attack route shown in Step2, and the attack route shown in Step3. Here, a thread case example for each of the attack routes shown in Steps1 to 3 can be embodied using the asset properties and threat DB 28.

FIG. 15 is a diagram showing one example of threat case examples embodied from the routes of attacks.

FIG. 15 shows threat DB 28 that associates source and destination types of the routes of attacks with threat case examples. Although here the description is given only of threat case examples of spoofing, tampering, and information leakage according to the STRIDE classification, descriptions about other activities such as service reject, denial, and privilege escalation may also be given as threat case examples.

For example, threat case examples for the attack route shown in Step1 can be embodied from the portion surrounded by the frame named Step1 shown in FIG. 15. Note that [process] describes Bluetooth communication, and [data flow] describes the destination information. The source type of the attack route shown in Step1 is Attacker, the destination type of the attack route is Process (Bluetooth communication). In the case where the threat scenario generated in FIG. 12 is about tampering of Integrity (I) according to the CIA classification, such a threat case as stating that "Attacker tampers code data in Bluetooth communication" may be embodied, and in the case where the threat scenario is about information leakage of Confidentiality (C), such a threat case as stating that "Attacker listens in to confidential information in Bluetooth communication" or that "Attacker listens in to the destination information in Bluetooth communication" may be embodied.

For example, threat case examples for the attack route shown in Step2 can be embodied from the portion surrounded by the frame named Step2 shown in FIG. 15. Note that [process A] describes Bluetooth communication, [process B] describes the remote parking function, and [data flow] describes the destination information. The source type of the attack route shown in Step2 is Process (Bluetooth communication), and the destination type of the attack route is also Process (remote parking function). For the attack route shown in Step2, a threat case example of tampering may be embodied, such as "Tampered target information is transmitted from Bluetooth communication to the remote parking function".

For example, threat case examples for the attack route shown in Step3 can be embodied from the portion surrounded by the frame named Step3 shown in FIG. 15. Note that [process] describes the remote parking function, [data store] describes the eMMC, and [data flow] describes the destination information. The source type of the attack route shown in Step3 is Process (remote parking function), and the destination type of the attack route Data store (eMMC). For the attack route shown in Step3, a threat case example of tampering may be embodied, such as "Tampered destination information is transmitted from the remote parking function to the eMMC".

Referring back to the description of FIG. 7, output unit 13 outputs the result of the analysis (analysis result 30) performed by analyzer 12 (step S14). Analysis result 30 is described with reference to FIG. 16.

FIG. 16 is a diagram showing one example of analysis result 30. Analysis result 30 of the parking location used in the remote parking function is given as one example in FIG. 16, and such analysis result 30 is output for each hardware component and each function.

For example, analysis result 30 may include a damage scenario or a threat scenario for each hardware component and each function. For example, it is clear that analysis result 30 shown in FIG. 16 includes a damage scenario stating that "Integrity of the parking location is violated and Major impact (losses equivalent to vehicle price) occurs on financial performance" and a threat scenario stating that "Tampering of the parking location violates integrity of the parking location and Major impact (losses equivalent to vehicle price) occurs on financial performance".

Alternatively, for example, analysis result 30 may further include a risk value that indicates the risk of an attack on an asset. For example, it is clear that analysis result 30 shown in FIG. 16 includes the risk value of "3". The risk value may be calculated from, for example, the impact assessment criteria and the attack likelihood assessment criteria.

FIGS. 17A to 17D are diagrams for describing the method of calculating the risk value. FIG. 17A shows a risk matrix created from the financial standpoint, FIG. 17B shows a risk matrix created from the safety standpoint, FIG. 17C shows a risk matrix created from the operational standpoint, and FIG. 17D shows a risk matrix created from the privacy standpoint.

For example, four different matrices, each being a matrix for evaluating the risk value from evaluation values of the impact and likelihood of an attack, may be defined respectively for the categories of safety, financial, operational, and privacy as shown in FIGS. 17A to 17D, or those matrices may be integrated into one matrix. Referring to, for example, the parking location used in the remote parking function shown in FIG. 16, in the case where the likelihood of an attack on the parking location is Medium and the impact of the attack on the parking location from the financial standpoint is Major, the risk value can be calculated as "3" from the risk matrix shown in FIG. 17A. For example, if the calculated risk value is determined as being at an unacceptable level as a product, "Reduction" may be selected as a method of coping with the risk and a cybersecurity goal is identified as measures against the corresponding threat scenario. In the case where the risk is not reduced (e.g., risk acceptance, risk sharing, or risk transfer), reasons for not reducing risks are described, and then the validity of the risk may be continuously managed according to changes in risk conditions.

Moreover, in order to make the cybersecurity goal match specific product requirements, product requirements serving as cybersecurity requests may be identified as management measures or countermeasures called cybersecurity control for each of a plurality of attack routes calculated based on the database shown in FIG. 15.

For example, measures can be taken in advance by checking analysis result 30 so as to assume the degree of likelihood of an attack, the impact of a possible attack, and the contents of damage scenarios and threat scenarios to be generated for each hardware component and each function in the initial stage of the vehicle development lifecycle.

As described above, in addition to the physical data flow of an asset relevant to a hardware component, the logical data flow of the asset relevant to a function allocated to the hardware component is also used as a basis to analyze attacks on the asset (security risks). Thus, even in the case of assuming an attack resulting from downloading of an unauthorized 3rd party application, it is possible to take measures against unauthorized entries from logical sessions and to accurately analyze security risks. For example, threats can be extracted comprehensively at a function level of a product. Besides, unnecessary route analysis can be eliminated by identifying the travel route of assets for each function from the logical data flow.

OTHER EMBODIMENTS

While the threat analysis method and threat analysis system 10 according to the embodiment of the present disclosure have been described thus far, the present disclosure is not intended to be limited to the aforementioned embodiment.

For example, although the aforementioned embodiment describes an example of deriving the physical data flow and the logical data flow, another hierarchical data flow may also be derived according to the situations of progress in design or the situations of risk analysis during development.

For example, although the aforementioned embodiment describes an example of performing analysis in accordance with attack likelihood assessment criteria 26, the analysis may be performed without using attack likelihood assessment criteria 26. In this case, the memory of threat analysis system 10 does not necessarily have to store attack likelihood assessment criteria 26.

For example, although the aforementioned embodiment describes an example of performing analysis in accordance with impact assessment criteria 27, the analysis may be performed without using impact assessment criteria 27. In this case, the memory of threat analysis system 10 does not necessarily have to store impact assessment criteria 27.

For example, although the aforementioned embodiment describes an example of acquiring design measure information 25, design measure information 25 may not be acquired. In this case, attack likelihood assessment criteria 26 does not need to be determined based on design measure information 25.

For example, although the aforementioned embodiment describes an example of generating the damage scenarios or the threat scenarios, the damage scenarios or the threat scenarios may not be generated. In this case, analysis result 30 does not need to include damage scenarios or threat scenarios.

For example, although the aforementioned embodiment describes an example of identifying the routes of attacks on assets in the physical data flow and the logical data flow, the routes of attacks may not be identified.

For example, although the aforementioned embodiment describes an example of analysis result 30 that includes the risk value, analysis result 30 does not need to include the risk value.

For example, although the aforementioned embodiment describes an example of storing attack likelihood assessment criteria 26 and impact assessment criteria 27 in the memory of threat analysis system 10, attack likelihood assessment criteria 26 and impact assessment criteria 27 may be stored in an external device outside threat analysis system 10, and threat analysis system 10 may acquire attack likelihood assessment criteria 26 and impact assessment criteria 27 from the external device.

For example, the steps in the threat analysis method may be executed by a computer (computer system). Then, the present disclosure may be implemented as a program for causing a computer to execute the steps included in the threat analysis method.

Moreover, the present disclosure may be implemented as a non-transitory computer-readable recording medium such as a CD-ROM for storing the aforementioned program.

For example, in the case where the present disclosure is implemented as a program (software), each step may be executed by execution of a program using hardware resources of the computer such as a CPU, memory, and an input/output circuit. That is, each step may be executed by the CPU acquiring data from, for example, the memory or the input/output circuit, performing computation on the acquired data, and outputting the result of the computation to, for example, the memory or the input/output circuit.

Each constituent element included in threat analysis system 10 according to the aforementioned embodiment may be implemented as a dedicated or general-purpose circuit.

Each constituent element included in threat analysis system 10 according to the aforementioned embodiment may also be implemented by large-scale integration (LSI) serving as an integrated circuit (IC).

The integrated circuit is not limited to LSI, and may be implemented as a dedicated circuit or a general-purpose processor. A field programmable gate array (FPGA) capable of programming or a reconfigurable processor capable of reconfiguring connections and settings of circuit cells inside LSI may be used.

Moreover, if any other circuit integration technique that replaces LSI makes its debut with the advance of semiconductor technology or with derivation from other technology, such a technique may be used to integrate the constituent elements into an integrated circuit.

Other modifications obtained by applying various changes conceivable by a person skilled in the art to the embodiments and modifications and any combinations of the structural elements and functions in the embodiments and modifications without departing from the scope of the present disclosure are also included in the present disclosure.

While one embodiment has been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-156545 filed on Sep. 27, 2021, and PCT International Application No. PCT/JP2022/018573 filed on Apr. 22, 2022.

INDUSTRIAL APPLICABILITY

The present disclosure is applicable to, for example, a system for analyzing vehicle security risks.

The invention claimed is:
1. A threat analysis method comprising:
acquiring system configuration information, function allocation information, asset information, and asset input/output information, the system configuration information indicating hardware components of a system for which threat analysis is performed, the function allocation information indicating functions allocated to the hardware components, the asset information indicating an asset used in each of the functions, the asset input/output information indicating hardware components of input and output sources and input and output destinations of the asset among the hardware components of the system, wherein the asset information includes a travelling trajectory of a vehicle equipped with a sensor, and wherein the travelling trajectory of the vehicle is acquired by capturing and processing sensor information via the sensor of the vehicle;

deriving a physical data flow and a logical data flow in accordance with the system configuration information, the function allocation information, the asset information, and the asset input/output information and analyzing a likelihood of an attack on the asset and an impact of the attack on the asset for each of the hardware components and each of the functions in accordance with the physical data flow and the logical data flow, the physical data flow indicating a flow of the asset relevant to each of the hardware components, the logical data flow indicating a flow of the asset relevant to each of the functions;

outputting a result of the analyzing; and performing, by the vehicle, a movement operation based on the outputted result of the analyzing.

2. The threat analysis method according to claim 1, wherein the analyzing is performed in accordance with an attack likelihood assessment criterion for assessing the likelihood of the attack on the asset, the attack likelihood assessment criterion being defined for each of the hardware components and each of the functions.

3. The threat analysis method according to claim 2, wherein the attack likelihood assessment criterion is defined based on design measure information indicating a measure applied to each of the hardware components and each of the functions.

4. The threat analysis method according to claim 1, wherein the analyzing is performed based on an impact assessment criterion for assessing the impact of the attack on the asset, the impact assessment criterion being defined for each of the hardware components and each of the functions.

5. The threat analysis method according to claim 1, wherein the analyzing further includes generating a damage scenario or a threat scenario in accordance with a predetermined database and a property of the asset for each of the hardware components and each of the functions, and the result of the analyzing includes the damage scenario or the threat scenario generated for each of the hardware components and each of the functions.

6. The threat analysis method according to claim 1, wherein the analyzing includes identifying an attack route to the asset in the physical data flow and the logical data flow in accordance with the physical data flow and the logical data flow and performing the analyzing in accordance with the attack route.

7. The threat analysis method according to claim 1, wherein the result of the analyzing includes a risk value that indicates a risk of the attack on the asset.

8. A threat analysis system comprising:

a memory;

a processor configured to:

acquire system configuration information, function allocation information, asset information, and asset input/output information, the system configuration information indicating hardware components of a system for which threat analysis is performed, the function allocation information indicating functions allocated to the hardware components, the asset information indicating an asset used in each of the functions, the asset input/output information indicating hardware components of input/output sources and input/output destinations of the asset among the hardware components of the system, wherein the asset information includes a travelling trajectory of a vehicle equipped with a sensor, and wherein the travelling trajectory of the vehicle is acquired by capturing and processing sensor information via the sensor of the vehicle during its movement operations;

derive a physical data flow and a logical data flow in accordance with the system configuration information, the function allocation information, the asset information, and the asset input/output information and analyzes a likelihood of an attack on the asset and an impact of the attack on the asset for each of the hardware components and each of the functions in accordance with the physical data flow and the logical data flow, the physical data flow indicating a flow of the asset relevant to each of the hardware components, the logical data flow indicating a flow of the asset relevant to each of the functions; and output a result of the analyzing; and the vehicle that performs a movement operation based on the outputted result of the analyzing.

* * * * *